Feb. 21, 1928.
W. H. SMYTH
1,660,105
CONVERTIBLE TRACTOR
Filed Dec. 16, 1924 3 Sheets-Sheet 1
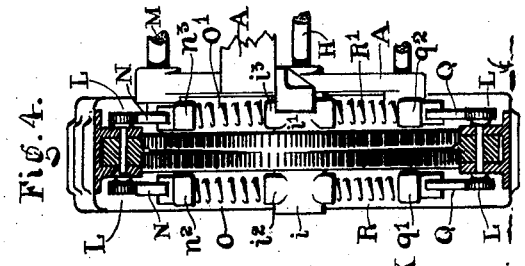
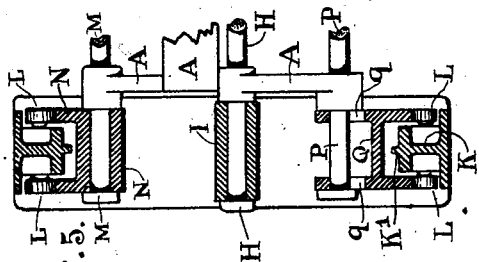
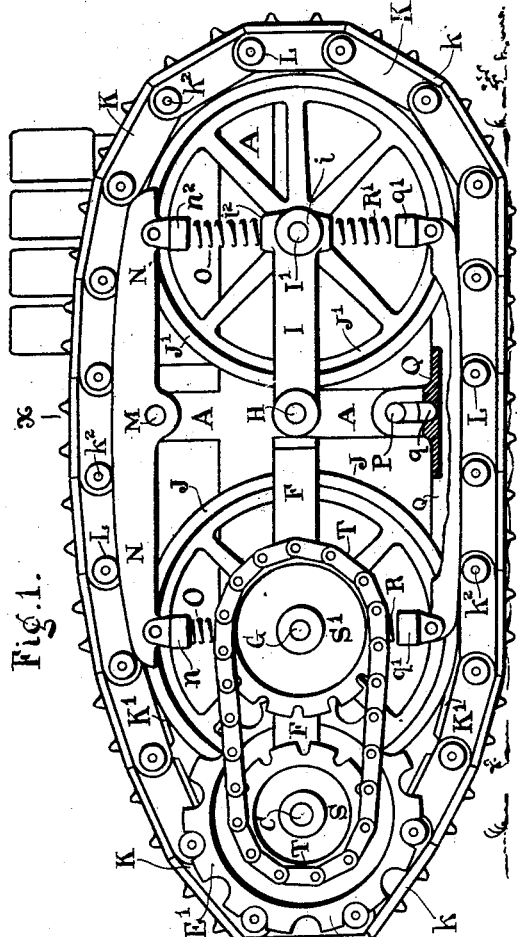
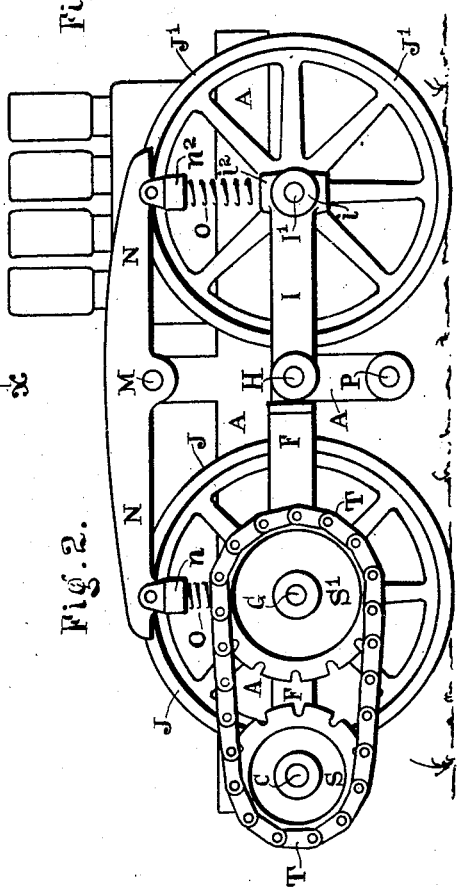
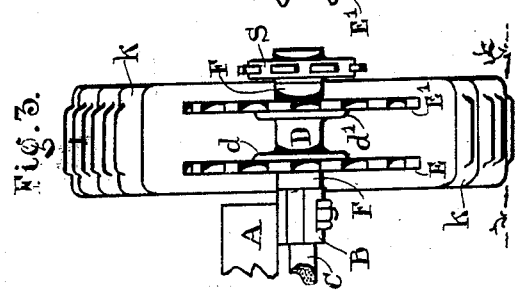
INVENTOR
William H. Smyth

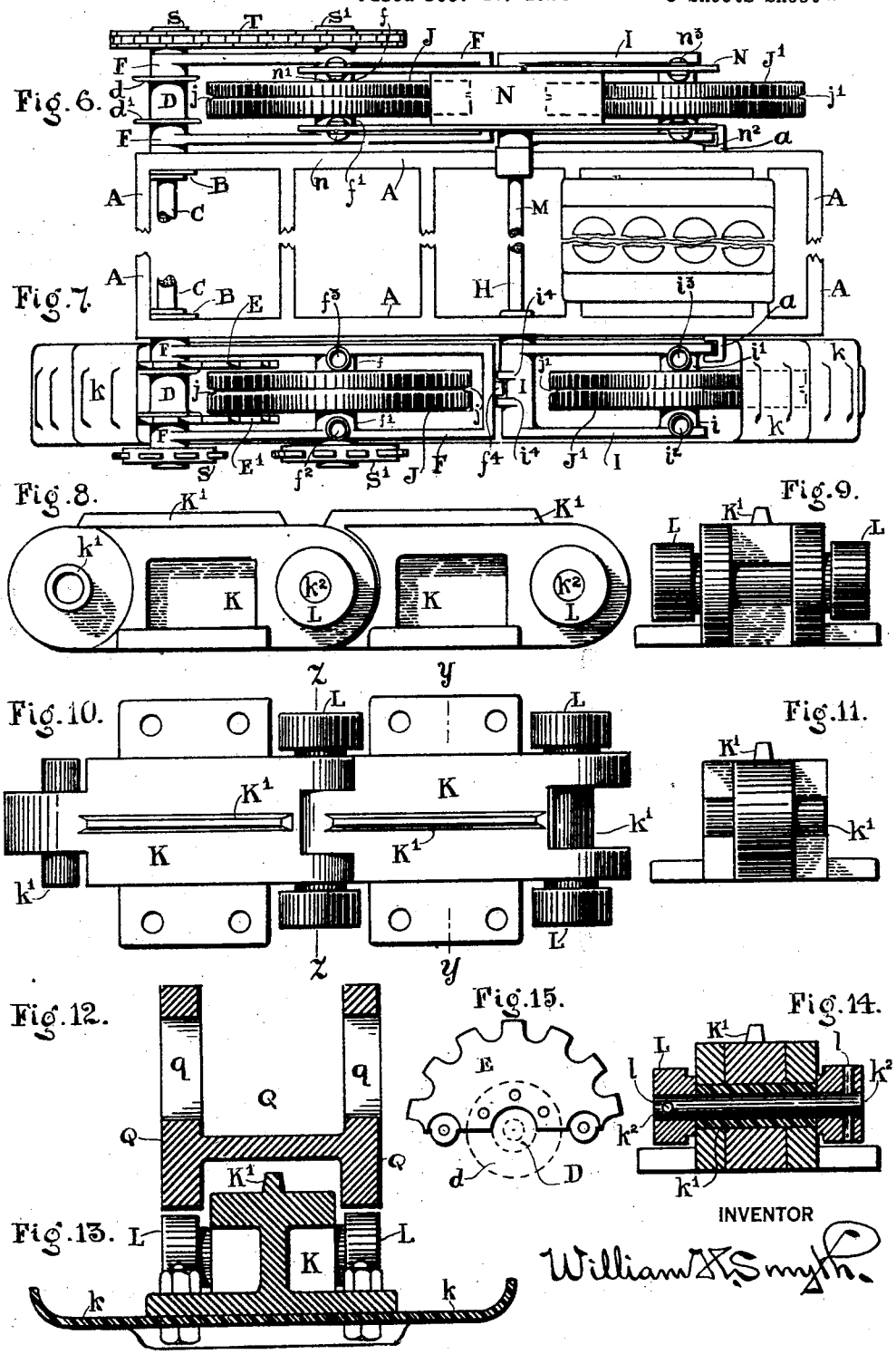

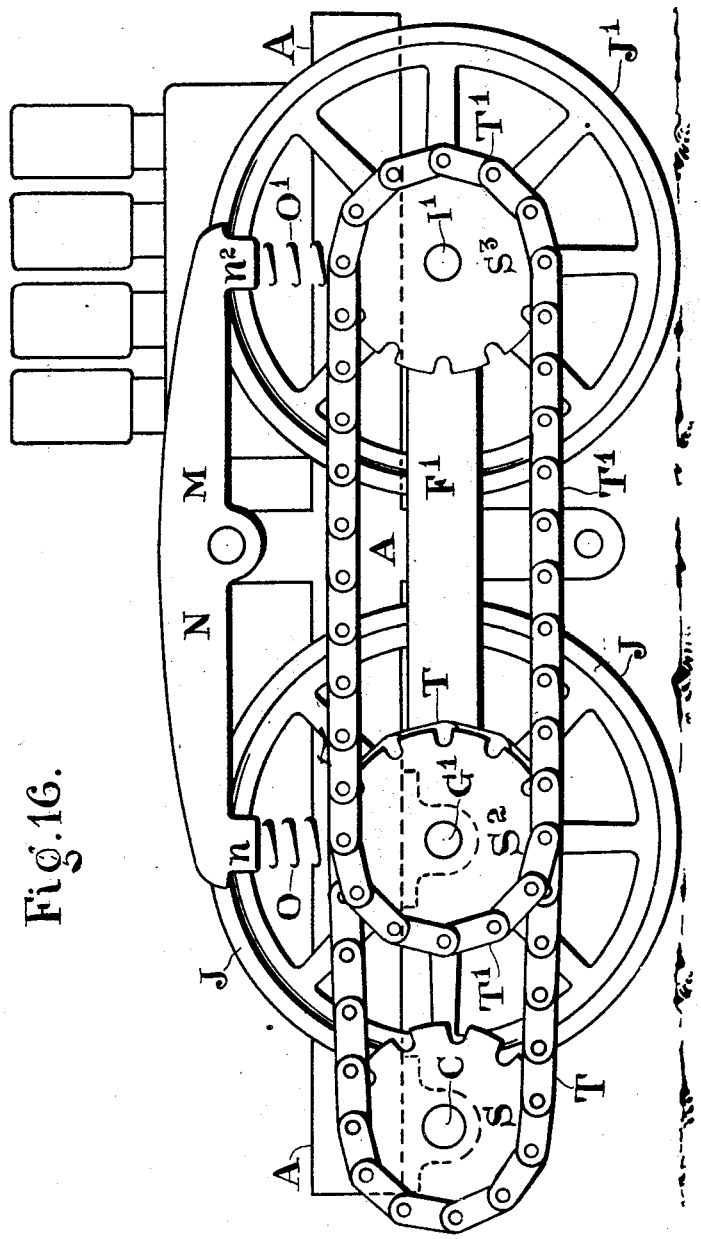

Patented Feb. 21, 1928.

1,660,105

UNITED STATES PATENT OFFICE.

WILLIAM H. SMYTH, OF BERKELEY, CALIFORNIA.

CONVERTIBLE TRACTOR.

Application filed December 16, 1924. Serial No. 756,246.

My invention relates to motor and other vehicles.

In agriculture; in heavy freighting over steep grades and on soft or otherwise unprepared ground; in military uses, and the like services the tracklayer tractor is peculiarly adapted by reason of its extensive ground contact and consequent tractive capability. But in all these employments there are present circumstances and conditions in which the 'round wheeler' has distinct advantages over the tracklayer. In agriculture there are many services in which tractive capability is of secondary importance compared to speed and economy of upkeep; in these the tracklayer is less desirable than the speedier and mechanically simpler 'round wheeler'. In freighting, it often happens that the return journey is with light or no loads; under these conditions the return journey on round wheels would effect a great saving of time and of other expenses. And, in military service where ground conditions permit, speed is of extreme importance, especially if it can be had in addition to tractive capability.

The object of the present invention is to provide a vehicle effectively meeting these diverse conditions and requirements of operation. Thus it has for its prime purpose to combine in one machine the advantageous functions and capabilities of both the tracklayer tractor and the 'round wheeler', without compromise or loss of efficiency in either form; to provide a vehicle of such character as to be usable in the form of a 'round wheeler' or as a tracklayer tractor, and readily convertible from one form to the other at will under conditions of use, without requiring special appliances or machine shop facilities. And incidental to this object to provide a convertible tractor constructed of few parts, easy to assemble or to dismember under normal circumstances or in cases of emergency. A further object is to so construct the device that not only as a round wheel vehicle but as a tracklayer tractor it shall be adapted to relatively fast speed of travel without the excessive wear and wastage of power incident to the latter type of tractor as heretofore constructed under commonly accepted practice.

A typical expression of my invention that accomplishes these objects is shown in the accompanying drawings wherein:

Fig. 1, shows a side elevation in tracklayer tractor form, one of its parts being broken away for better illustration;

Fig. 2, is a similar view to Fig. 1, with the specific tracklayer tractor parts removed; thus transforming it into a 'round wheeler' and constituting the device a substantially normal four wheeled spring-supported motor truck;

Fig. 3, shows a rear elevation of one track assembly, parts being removed for better illustration;

Fig. 4, is a similar view of the front end; with parts in section;

Fig. 5, shows a vertical cross section on the line $x$—$x$, of Fig. 1;

Fig. 6, shows a plan view of one side of the machine in the condition shown in Fig. 2;

Fig. 7, is a similar view but relating to Fig. 1, and with parts removed for better illustration;

Fig. 8, shows, on enlarged scale, a side view of two links of a track-chain adapted to be used in the device when operating in the form of a tracklayer tractor;

Fig. 9, shows an end elevation of one of the links illustrated in Fig. 8;

Fig. 10, shows an inner plan view of Fig. 8;

Fig. 11, is a similar view to Fig. 9, showing the opposite end of the link;

Fig. 12, shows a transverse section of a rocker-rail for the ground run of the track-chain, placed in its relative position in respect thereto;

Fig. 13, shows a transverse section of a link on the line $y$—$y$ of Fig. 10, and a section of a tread-shoe attached thereto;

Fig. 14, shows a section of a link on the line $z$—$z$ of Fig. 10;

Fig. 15, shows a side view of a (half) segment of the track-chain sprocket-wheel, with the flanged hub to which it is normally secured shown in dotted lines;

Fig. 16, shows a side view, in which both support-wheels are positively driven.

It should be noted that I have drawn the various views with less reference to exact relative proportion in form or metal section, than with the aim of making clear the salient features of the invention; and that the vehicle body-frame and motor devices are merely indicated in a conventional manner. Wide latitude of design is left to the discretion of the constructor, guided by the particular requirements of the service to which the device is intended to be applied.

In vehicles built in accordance with my invention, if there are two sets of wheels or track-assemblies these will be substantially alike; so, for the sake of brevity, I will hereinafter largely confine my description to one side, and to those parts of the complete vehicle directly affected by my invention. Also I will omit description of the motor element and its supporting framework, these being within the knowledge of those skilled in the art.

With this understanding, and referring to the accompanying drawings, A, represents the framework pertaining to a vehicle, with or without a motor.

The frame A, carries a journal-box B, in which is seated a shaft C, adapted to be driven by a suitable motor supported on frame A.

Outboard of frame A, upon shaft C, is secured a hub D, provided with flanges $d$, $d^1$, and to these flanges are detachably secured twin sprocket-wheels E, $E^1$, (Figs. 3, 6 and 7,) preferably formed in segments to be readily removable, as shown for example, in Fig. 15, wherein each member of the twin sprocket-wheel is made as a similar (half) segment, with bolt holes for attachment to the flanges of hub D, which hub and flanges are indicated by dotted lines in this figure.

A pivoted wheel-yoke F, consisting of side members tied to each other by suitably positioned cross-ties, extends forwardly of shaft C and is provided with correspondingly positioned journal-boxes $f$, $f^1$, (Fig. 6,) in which is journalled a shaft G, (Figs. 1 and 2.).

Forward of this wheel-yoke in alignment therewith may be provided a second pivoted wheel-yoke I, substantially similar to F and provided with a shaft $I^1$, seated in suitable journal-boxes on the side members of yoke I, pivoted on a shaft H, transverse of frame A, as shown in Fig. 1.

Upon shaft G, is secured a support-wheel J, preferably provided with a circumferential groove $j$, and upon the shaft $I^1$, is a similar support-wheel $J^1$, similarly provided with a groove $j^1$. The circumferential grooves $j$, $j^1$, of support-wheels J, $J^1$, are in alignment and aligned with the middle of hub D central of the twin sprocket-wheels E, $E^1$, as shown in Figs. 6 and 7.

Trained around the twin sprocket-wheels E, $E^1$, and the support-wheels J, $J^1$, is a track-chain K. This track-chain preferably consists of hinged links provided with suitable tread-shoes $k$, shown in section in Fig. 13, adapted to ground support. The links of the track-chain are preferably united by rotatable sleeves or loose bushings $k^1$, shown in Figs. 8, 9, 10, 11 and, in section, in Fig. 14, the sleeves being of a length corresponding to the width of the chain track. Seated in and passing through each sleeve is a rotatable axle $k^2$, provided on each of its ends with an antifriction roller L, secured thereto preferably by means of a tightly driven pin $l$, as shown in Fig. 14. The sleeve hinge pin $k^1$, with its inner axle $k^2$, permits the hinge action of track-chain K, under stress of operation without cramping the free rotation of the antifriction rollers L, L, and these rollers serve as effective collars to maintain the sleeves in position.

Longitudinally of the track-chain and projecting inwardly of its track surface is a flange or rib $K^1$, preferably intermediate of its sides, and suitably positioned to engage with the circumferential grooves $j$, $j^1$, of support-wheels J, $J^1$, as shown in Fig. 4, and in detail Figs. 8 to 11, 13 and 14.

Transversely of frame A, and secured thereto above axle H, is another axle M. Outboard of the frame, upon the axle M, is pivoted a strong rocker-beam N. It is formed of two connected parallel members disposed longitudinally of the machine and spaced apart a distance slightly greater than the width of the chain track. The side members of the rocker-beam are sufficiently long and so disposed as to extend on each side of the support-wheels J, $J^1$, and somewhat beyond their vertical diameters. The upper surfaces of the side members of the rocker-beam N, are preferably curved upward toward the middle of the beam, and constitute a lateral guide for the track-chain K, and supporting rails for its antifriction rollers L, L, as shown in Figs. 1, 4 and 5. Each of the side members of the rocker-beam N, near each end is provided with a socket spring-abutment, that is, one to each end of each side member, as shown in Figs. 1, 2, 4, 6, at $n$, $n^1$, $n^2$, $n^3$; and corresponding and coacting socket spring-abutments are located respectively on the journal-boxes $f$, $f^1$, of yoke F, and bosses $i^2$, $i^3$, of yoke I, as shown most clearly in Fig. 7.

Seated between the respective corresponding socket spring-abutments of the rocker-beam N, and those of the wheel-yokes are springs O, $O^1$, (Figs. 1, 2 and 4.).

Below the axle H, is another axle P, transverse of frame A, and secured to the frame, extending outboard thereof. Upon the axle P, outboard of the frame, is a rocker-guide Q, substantially similar to the rocker-beam N inverted with the exception that the pivotal hole $q$ of the latter rocking member engaging with axle P, is somewhat elongated vertically to permit of vertical movement by the rocker-guide Q, instead of being a round hole snugly fitting its pivotal axle as does that of the rocker-beam N; also the rocker-guide Q, is disposed similarly to the lower segments of support-wheels J, $J^1$, as the rocker-beam is to their upper segments. The ends of the rocker-guide members are supplied, like the rocker-beam, with socket spring-abutments $q^1$, $q^2$, respectively. Corresponding to and coacting with these last mentioned socket spring-abutments are other sockets on the lower sides of yokes F, and I, and between these corresponding sockets are springs R, R¹, (Fig. 1,) when, as is shown in Fig. 1, the device is used in the tracklayer tractor form.

On the outboard end of shaft C is secured a chain wheel S, and upon each shaft G, is secured another in alignment therewith. Trained around the aligned wheels S, S¹, is a drive chain T.

Projecting from the forward end of yoke F, is a strong abutment guide-block $f^4$, and projecting rearwardly from yoke I, are coacting lugs $i^4$, $i^4$; one laterally abutting each side of guide-block $f^4$; and on frame A, adjacent to the forward end of yoke I, is secured a slotted guide a, suitably positioned to receive in its slot the projecting end of the inner side member of yoke I. Both of these yoke guide means are clearly shown in Fig. 7.

In the form and condition of assemblage indicated in Fig. 1 the device has the characteristics and performs the functions normal to tracklayer tractors while possessing capabilities peculiar to the present invention to which reference will later be made.

To transform the device shown in Fig. 1, into a round wheel vehicle it is only needed to remove the track-chain K, and the rocker-guide Q, with its spring R, R¹. The sprocket-wheels E, E¹, may also be removed, though this is not necessary.

It will be observed that in Figs. 1, 2 and 6, the chain T, is shown in driving association with its chain wheels, while in Fig. 7, it is absent. This absence of the chain is merely a matter of illustration and does not indicate any necessity requiring the removal of chain T, when the device is functioning as a tracklayer tractor. If the chain-wheels S, S¹, bear the same rotational speed relation to each other that the track-chain sprocket-wheels bear to the support-wheel J, then there will be an advantageous unison of drive on the track-chain K, and support-wheel J. Thus the latter becomes an active positively driven traction element in the progressive advance movement of the machine; and in consequence of this positive drive of the support wheel J, the track-chain is relieved the wear producing fluctuations of slack and taut in its upper run.

In operation as a tracklayer tractor the load is borne on the support-wheels J, J¹; and the track-chain between the peripheries of the support-wheels, in the ground run, does not bear load except on the link directly below and upon which the support-wheel is in contact. Thus the antifriction rollers L, L, between the support-wheels are relieved of load-bearing duty. The spring-pressed rocker-guide Q, exerts only such pressure on the antifriction rollers as to cause the tread-shoe cleats or 'grousers' to be embedded in the ground, to ensure tractive effect. And on uneven ground the rocker-guide resiliently and progressively gives to the inequalities; and so maintains tractive contact of the track-chain between the effective support points of the support-wheels J, J¹.

The rocker-beam N, with its interposed springs O, O¹, is an equalizer of load on all support wheels. On uneven ground each of the wheels J, J—J¹, J¹, bears an equal share of the total load of the machine, and thus the frame A, is relieved of torsional strains. This desirable function and effect is equally present whether the device is acting as a tracklayer tractor or as a round wheel vehicle and whether as a motor vehicle or otherwise. It is due to the independent spring-controlled adjustability of each and all of the support wheels. In addition the rocker-beam serves as a twin-rail support and guide for the upper run of the track-chain in coaction with the antifriction rollers which travel smoothly upon its upper curved surfaces. Thus the track-chain is led from its driving sprocket wheels E, E¹ to support-wheel J¹, without catenary sag and incidental and detrimental vibrational jarring. Both the rocker-beam N, and the rocker guide-rail Q, serve not alone as preventive means against track-chain buckling and hinge-joint kinking but also perform the equally important function of lateral guidance and resistance to side-thrust of the track-chain between the peripheries of the support-wheels J, J¹; and the track-chain rib K¹, keeps the chain in proper position while it is passing around the wheel J¹, by coaction with the circumferential groove $j^1$. The abutments $f^4$, $i^4$, $i^4$, and a, guard the wheel-yokes F, and I, against lateral displacement.

For conditions of operation that make it desirable to positively drive both support-wheels in each wheel-assembly, the yokes F, and I, may be united in one yoke F¹, pivoted at G¹, to frame A. On the shaft G¹, may then be secured a second chain-wheel S², and on the shaft I¹, may be secured a corresponding chain-wheel S³, in alignment with S², and these connected in operative association by a drive-chain T¹, as shown in Fig. 16.

By the novel construction and arrangement herein set forth, a convertible tractor is produced that is readily changeable from a tracklayer tractor into a round-wheel motor vehicle or vice versa, as occasion requires. As a tracklayer tractor it provides a long, self-adjusting resilient ground contact with a minimum over-all length of machine. By the employment of the rocker-guide Q, the customary truck of common tracklayer practice with its many crowded truck-wheels is entirely dispensed with. The present invention gives a two-point track-assembly wheelbase resiliently accommodating its support-wheels to ground contours with consequent avoidance of uneven ground torsional strains on frame A, and the upper run of the track-chain has continuous guidance and antifriction support by the coaction of the antifriction roller L, L, with rocker-beam N.

As a round-wheel vehicle the device provides a four-wheel drive with spring controlled independent adjustability to ground contours with consequent relief from torsional strains on the vehicle frame.

In view of these radical and functionally important departures from accepted and customary practice in vehicle construction, I do not desire to be limited to the particular expression of my invention used herein for illustrative purposes, nor to be limited in any way other than in accord with a liberal interpretation and the reasonable import of the claims that follow.

I claim:

1. In a track-assembly for vehicles, an endless track-chain, a sprocket-wheel near one end, an oppositely disposed load-supporting wheel coacting with the sprocket-wheel to maintain the upper and lower runs of the track-chain in the same plane of travel and a power-driven support-wheel travelable upon the ground run of the track-chain adjacent to the sprocket-wheel to form with the first mentioned support-wheel a two-point-support wheel-base for the assembly.

2. In a track-assembly for vehicles, an endless track-chain with antifriction rollers journaled thereon, a sprocket-wheel near one end, an oppositely disposed load-supporting wheel coacting with the sprocket-wheel to maintain the upper and lower runs of the track-chain in the same plane of travel, a second support-wheel travelable upon the ground run of the track-chain adjacent to the sprocket-wheel to form with the first mentioned support-wheel a two-point-support wheel-base for the assembly and means engaging the antifriction rollers to control the flexure of the track-chain.

3. In a vehicle, a frame, a sprocket-wheel journaled thereon, a yoke pivotally connected to the frame, a load-supporting wheel journaled on the yoke aligned with the sprocket-wheel near the opposite end of the frame and a power-driven support-wheel adjacent to the sprocket-wheel coacting with the first mentioned support-wheel to form a two-point-support wheel-base for the vehicle.

4. In a vehicle, a frame, a sprocket-wheel journaled thereon near one end, a load-supporting wheel aligned with the sprocket-wheel near the other end of the frame and a power-driven support-wheel journaled adjacent to the sprocket-wheel coacting with the first mentioned support-wheel to form a two-point-support wheel-base for the vehicle.

5. In a vehicle, a frame, a sprocket-wheel journaled thereon near one end, a yoke pivotally connected to the frame, a load-supporting wheel aligned with the sprocket-wheel journaled on the yoke, a second yoke pivotally connected to the frame and a power-driven support-wheel journaled on the second yoke adjacent to the sprocket-wheel coacting with the first mentioned support-wheel to form a two-point-support wheel-base for the vehicle.

6. In a track-assembly for vehicles, an endless track-chain, a sprocket-wheel near one end, an oppositely disposed load-supporting wheel coacting with the sprocket-wheel to maintain the upper and lower run of the track-chain in the same plane of travel, a support-wheel travelable upon the ground run of the track-chain to form a two-point-support wheel-base for the assembly and a load-equalizer to distribute the load equally on the support-wheels.

7. In a vehicle, a frame, a power-wheel journaled thereon near one end, an oppositely disposed load-supporting wheel aligned with the power-wheel, a second support-wheel adjacent to the power-wheel coacting with the first mentioned support-wheel to form a two-point-support wheel-base for the vehicle and a load-equalizer between the support-wheels pivotally connected with the frame.

8. In a vehicle, a frame, a power-wheel journaled thereon near one end, an oppositely disposed load-supporting wheel aligned with the power-wheel, a second support-wheel adjacent to the power-wheel coacting with the first mentioned support-wheel to form a two-point-support wheel-base for the vehicle, and a spring-actuated load-equalizer lever pivotally connected to the frame.

9. In a track-assembly for vehicles, an endless track-chain, a sprocket-wheel near one end, an oppositely disposed load-supporting wheel coacting with the sprocket-wheel to maintain the upper and lower runs of the track-chain in the same plane of travel, a support wheel travelable upon the ground run of the track-chain to form with the first mentioned support-wheel a two-point-support wheel-base for the assembly and a load-equalizer lever between the peripheries of the support-wheels coacting with the track-chain to control its flexure.

10. In a track-assembly for vehicles, an endless track-chain, a sprocket-wheel near one end, an oppositely disposed load-supporting wheel coacting with the sprocket-wheel to maintain the upper and lower runs of the track-chain in the same plane of travel, a support-wheel travelable upon the ground run of the track-chain to form with the first mentioned support-wheel a two-point-support wheel-base for the assembly and a load-equalizer lever between the upper peripheries of the support-wheels coacting with the track-chain to control its flexure.

11. In a track-assembly for vehicles, an endless track-chain, a sprocket-wheel near one end, an oppositely disposed load-supporting wheel coacting with the sprocket-wheel to maintain the upper and lower runs of the track-chain in the same plane of travel, a support-wheel travelable upon the ground run of the track-chain to form with the first mentioned support-wheel a two-point-support wheel-base for the assembly and a guide means between the lower peripheries of the support wheels coacting with the track-chain to control its flexure.

12. In a track-assembly for vehicles, an endless track-chain, a sprocket-wheel near one end, an oppositely disposed load-supporting wheel coacting with the sprocket-wheel to maintain the upper and lower runs of the track-chain in the same plane of travel, a support-wheel travelable upon the ground run of the track-chain to form with the first mentioned support-wheel a two-point-support wheel-base for the assembly, a load-equalizer lever between the upper peripheries of the load-support wheels and guide means between the lower peripheries of the support-wheels coacting with the track-chain to control its flexure.

13. In a track-assembly for vehicles, an endless track-chain of overlapping links with a longitudinal rib raised inwardly of the track surface, a tubular hinge-pin uniting adjacent links, an axle journaled in the tubular hinge-pin, a roller on the axle, support-wheels for the assembly adapted to engage with the raised rib on the track and a rail member coacting with the rollers to control the flexure of the track-chain.

14. In a track-assembly for vehicles, an endless track-chain of overlapping links with a rib raised inwardly of the track surface, a tubular hinge-pin uniting adjacent links, an axle journaled in the tubular hinge-pin, a roller on each end of the axle, support-wheels for the assembly each provided with a circumferential groove positioned to engage with the raised rib and rail members coacting with the rollers to control the flexure of the track-chain.

15. In a track-chain for vehicles, overlapping hinged links with a longitudinal rib raised inwardly of the track surface, a tubular hinge-pin uniting adjacent links, an axle journaled in the tubular hinge-pin and a roller on the axle.

16. In a track-chain for vehicles, overlapping hinged links with a longitudinal rib raised inwardly of the track surface intermediate of the track sides, a tubular hinge-pin uniting adjacent links, an axle journaled in the tubular hinge-pin and a roller secured on each end of the axle.

WILLIAM H. SMYTH.